United States Patent

[11] 3,628,204

[72] Inventor Herbert J. Hoffman, Jr.
433 Bontona Ave., Fort Lauderdale, Fla. 33301
[21] Appl. No. 52,437
[22] Filed July 6, 1970
[45] Patented Dec. 21, 1971

[54] FISH DECK
10 Claims, 6 Drawing Figs.

[52] U.S. Cl. .................................................... 9/1
[51] Int. Cl. ........................................... B63b 25/18
[50] Field of Search ........................................... 9/6, 1; 114/.5

[56] References Cited
UNITED STATES PATENTS

| | | | |
|---|---|---|---|
| 2,473,874 | 6/1949 | Ganong ....................... | 9/1 |
| 3,174,452 | 3/1965 | Rickborn ...................... | 9/1 X |
| 3,312,990 | 4/1967 | Lapworth ..................... | 9/1 |

*Primary Examiner*—Milton Buchler
*Assistant Examiner*—Carl A. Rutledge
*Attorney*—Fred L. Witherspoon, Jr.

ABSTRACT: A fish deck adapted to be secured to the stern of a boat providing a surface for cleaning fish and including means for supporting fishing rods, bait pails, a fish box and a gaff.

INVENTOR.
Herbert J. Hoffman, Jr.
BY Fred L. Witherspoon, Jr.
ATTORNEY

INVENTOR.
Herbert J. Hoffman, Jr.

BY Fred L. Witherspoon, Jr.

ATTORNEY

FISH DECK

SUMMARY OF THE INVENTION

This invention relates to a device which readily converts a pleasure craft into a fishing boat with all of the facilities normally built permanently into a fishing boat.

Most boat owners are also avid fishermen and, when engaged in the sport, desire that their boats be equipped in a manner that the necessary equipment is readily accessible. Rod holders are almost always present on boats used for fishing.

A successful fishing trip creates considerable mess aboard the boat. Additionally, many fishermen clean the fish on their return trip so the trimmed portions and debris may be thrown into the water. This adds to the mess considerably.

Prior to using the boat for pleasure, considerable arduous cleaning must be done to remove the blood, scales and odor. Even after cleaning the boat, many people find the presence of various fishing equipment undesirable on a pleasure cruise. It is therefore an object of this invention to provide a fish deck for temporarily converting a pleasure boat into a fishing boat. It is another object of this invention to provide a fish deck for supporting fishing gear in a manner wherein the gear is readily accessible.

It is still another object of this invention to provide a fish deck which serves as a table for cleaning fish which may be easily cleaned.

DESCRIPTION OF THE DRAWINGS

These and other object of the invention will become more readily apparent upon consideration of the following description and drawings in which.

DESCRIPTION OF THE INVENTION

Figure 1:
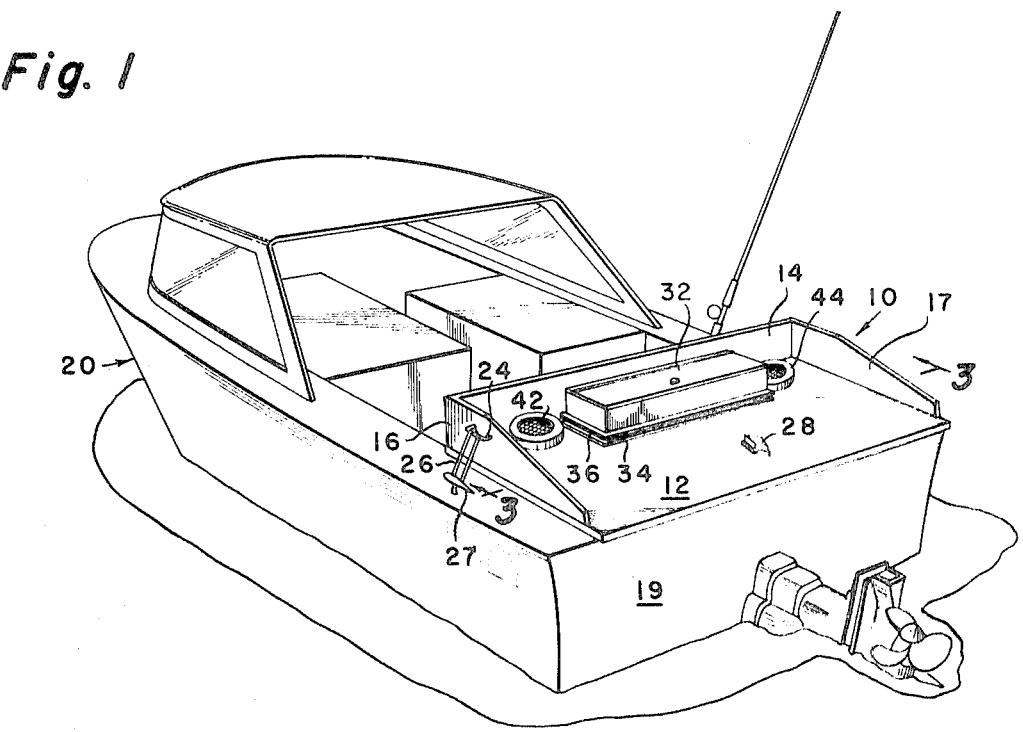
FIG. 1 is a perspective view of the fish deck secured to a boat.

Referring to the drawings, the fish deck 10 comprises a horizontal working surface 12, a front vertical wall 14 extending along the forward side thereof and vertical end walls 16 and 17. The rear side 18 is open and extends aft slightly beyond the transom 19 of the boat when the fish deck 10 is secured to the stern of the boat 20 in the manner illustrated in FIG. 1.

Figure 3:
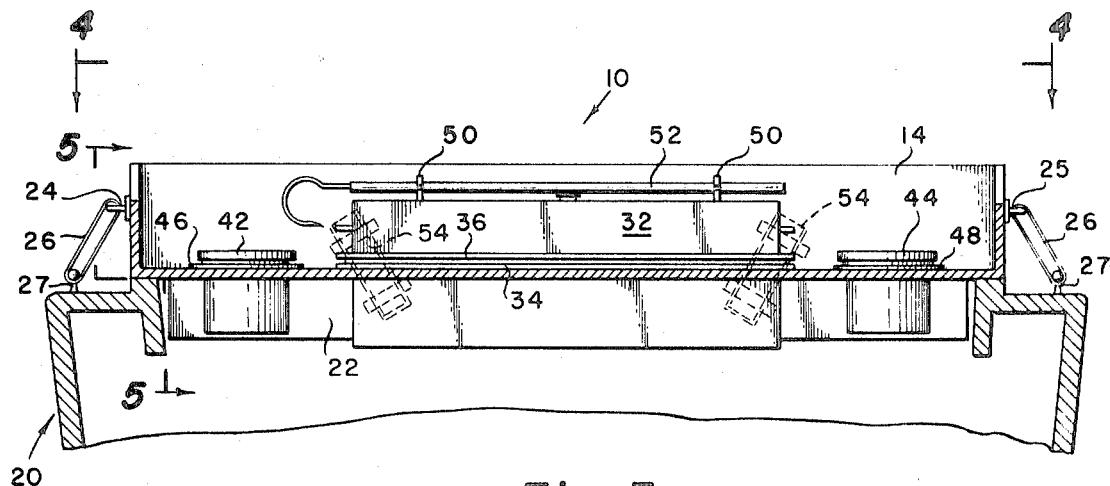
FIG. 3 is a partial sectional view taken on line 3—3 of FIG. 1.
Figure 4:
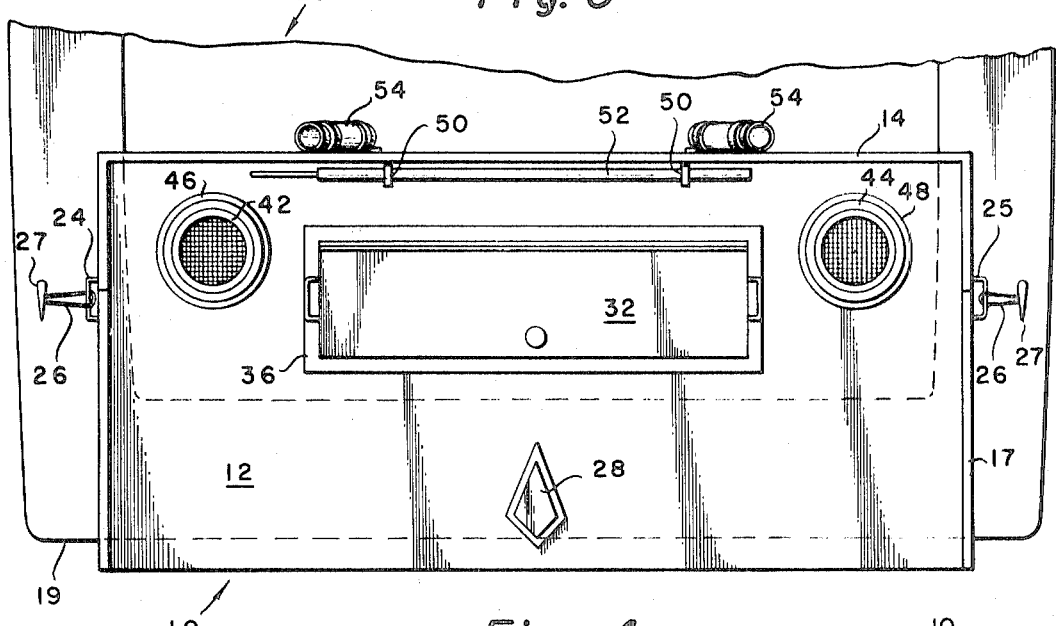
FIG. 4 is a partial plan view taken on line 4—4 of FIG. 3.
Figure 6:
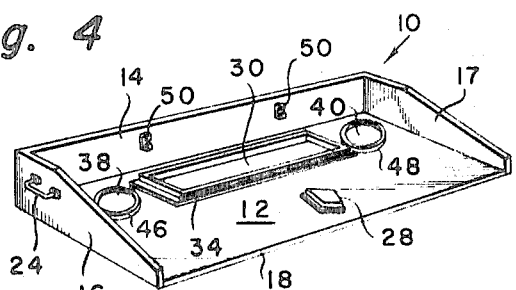
FIG. 6 is a perspective view of the fish deck.
Figure 5:
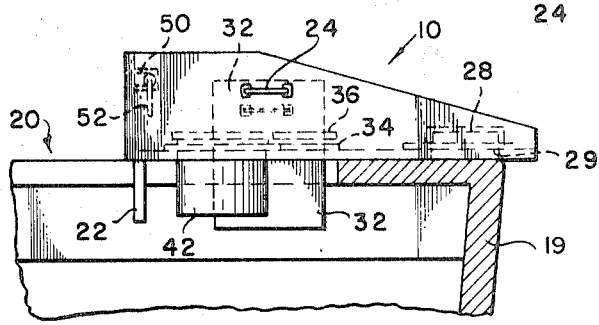
FIG. 5 is a partial side view taken on line 5—5 of FIG. 3.

A retaining member 22, FIGS. 3 and 5, depends from the front wall 14 and limits movement of the fish deck 10 transversely of the stern. Handles 24 and 25 are secured to the end walls 16 and 17, respectively, to facilitate handling of the fish deck 10 when mounting it on or removing it from the boat 20.

Shock cords 26 or other suitable means extending between handles 24, 25, and cleats 27 may be used to secure the fish deck 10 to the boat 20.

A bubblelike housing 28 encloses an opening 29 in the surface 12, as best illustrated in FIG. 5. The opening 29 is provided to accommodate ventilators, flag holders, lights and any similar upstanding elements on the transom of the boat 20. The housing 28 is secured to the surface 12 in a conventional manner so that liquid on the surface 12 will not leak down through the opening 29 and into or onto the boat 20. The housing 28 may be formed of transparent material or at least a portion thereof so the light will be visible therethrough.

The fish deck surface 12, adjacent the wall 14, is provided with an elongate opening 30 which is adapted to receive a fish box 32. The size and shape of the opening 30 may vary to correspond to the size and shape of the fish box 32 to be used with the fish deck 10. A wall 34 similar to coaming surrounds the opening 30 to prevent liquid on the surface 12 from leaking therethrough into the boat 20. A flange 36 extending from the walls of the fish box 32 rests on the top of the wall 34 to support the fish box 32, as best illustrated in FIG. 3.

The surface 12 is also provided with a pair of circular openings 38 and 40 adapted to receive bait pails 42 and 44, respectively. The openings 38 and 40 are also provided with upstanding walls 46 and 48 similar to coaming to prevent leakage of liquid down into the boat. The bait pails 42 and 44 are inserted into the openings with their rims resting on the walls 46 and 48.

On the aft side of the front wall 14, clamps 50 are provided for storing a gaff 52. Conventional rod holders 54 are secured to the forward side of the wall 14.

Figure 2:
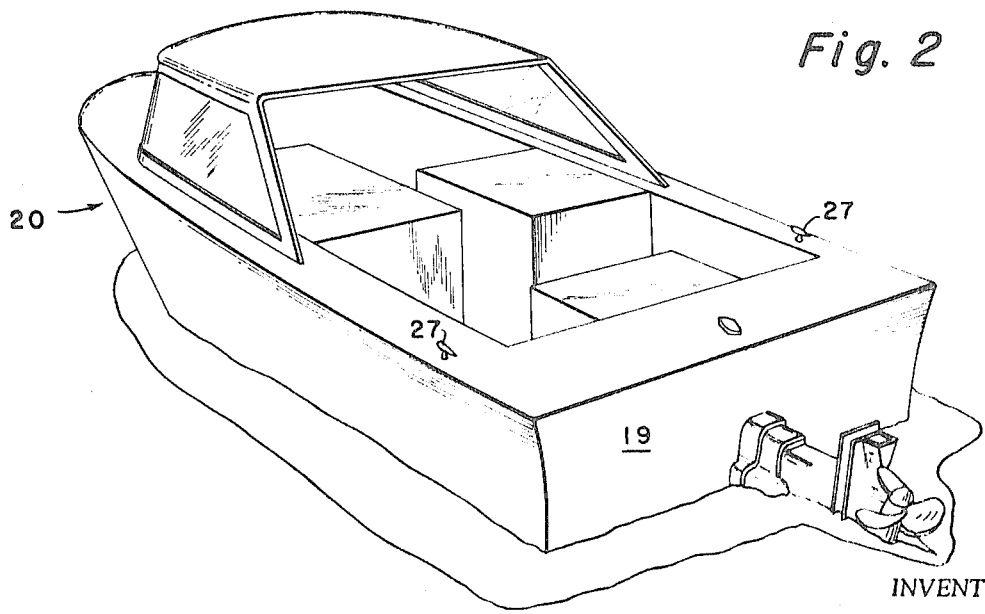
FIG. 2 is a perspective view of the same boat with the fish deck removed.

From the foregoing, it will be readily apparent that the invention provides means for converting a pleasure boat, as shown in FIG. 2, into a comfortably equipped fishing boat, as shown in FIG. 1. The fish deck 10 supports the fish box 32 and the bait pails 42 and 44 so that they are readily accessible to the fisherman. The fish box 32 and bait pails 42 and 44 are supported at a height so they do not obstruct the fishermen when cleaning fish on the after portion of working surface 12. The fish deck 10 is constructed so it may be flushed with water for cleaning without any water passing into the boat. All of the debris is washed aft of the boat, with the surface 12 extending slightly beyond the transom 19 of the boat to prevent water from dripping thereonto.

The fish deck 10 may be readily removed from the boat whereby the boat 20 is immediately available for pleasure cruising. The fish deck 10, when removed, may be cleaned thoroughly with ease at a convenient location.

The fish deck may be formed of plywood covered with fiberglass and coated with resin, or it may be formed entirely of plastic. Any material not readily affected by water would be suitable.

The fish deck 10 is constructed so that it may be used with any type of conventional boat and may be provided in a plurality of widths to fit the more popular sizes of boats.

When installing the fish deck 10 on the boat 20, it is necessary only to place it in position on the transom of the boat 20 with the retaining member extending between the sides of the boat 20. The fish deck is then secured by the shock cords 26 and is ready for use.

I claim:

1. A fish deck comprising a decklike structure adapted to be removably secured to the stern of a boat, said decklike structure including means for supporting a fish box and at least one bait container, and said decklike structure covering the stern portion of the boat so that any liquid flowing on the surface of said decklike structure will not enter the boat but will flow off an open side of said decklike structure extending slightly beyond the transom of the boat.

2. A fish deck as set forth in claim 1 wherein said decklike structure includes a planar surface bounded on three sides by upstanding walls and the fourth side thereof extending beyond the stern of the boat.

3. A fish deck as set forth in claim 2 wherein one of said upstanding walls is provided with clamp means for removably supporting a gaff on one side thereof.

4. A fish deck as set forth in claim 3 wherein said upstanding wall has fish rod holders secured to the other side thereof.

5. A fish deck as set forth in claim 1 wherein said means for supporting said fish box comprises a planar surface having an elongate opening and abutments adjacent said opening adapted to engage means on said fish box.

6. A fish deck as set forth in claim 5 wherein said abutment means adjacent said opening comprises an upstanding wall.

7. A fish deck as set forth in claim 5 wherein said means for supporting said bait container comprises a further opening in said planar surface and an abutment surrounding said opening adapted to engage means on said bait container.

8. A fish deck as set forth in claim 7 wherein said abutment means adjacent said opening comprises an upstanding wall.

9. A fish deck as set forth in claim 2 wherein handles are affixed to two walls thereof to facilitate handling.

10. A fish deck as set forth in claim 2 wherein said decklike structure includes a depending member to limit transverse movement of said decklike structure relative to said boat.

* * * * *